US006529124B2

(12) United States Patent
Flick (10) Patent No.: US 6,529,124 B2
(45) Date of Patent: *Mar. 4, 2003

(54) REMOTE VEHICLE FUNCTION CONTROL SYSTEM USING DATA BUS ADAPTOR CARTRIDGE AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 161 days.

This patent is subject to a terminal disclaimer.

(21) Appl. No.: 09/780,245

(22) Filed: Feb. 9, 2001

(65) Prior Publication Data

US 2001/0029415 A1 Oct. 11, 2001

Related U.S. Application Data

(63) Continuation-in-part of application No. 09/583,257, filed on May 31, 2000, which is a continuation-in-part of application No. 09/382,245, filed on Aug. 25, 1999, now Pat. No. 6,275,147, which is a continuation of application No. 09/023,838, filed on Feb. 13, 1998, now Pat. No. 6,011,460, which is a continuation-in-part of application No. 08/701,356, filed on Aug. 22, 1996, now Pat. No. 5,719,551.

(51) Int. Cl.[7] .............................................. B60R 25/10
(52) U.S. Cl. .................... 340/426; 340/425.5; 340/531; 307/10.2; 180/287
(58) Field of Search ................................ 340/426, 427, 340/428, 429, 531, 532, 533, 539, 5.1, 5.2, 5.72, 825.69; 307/9.1, 10.1, 10.2, 10.5, 10.6; 439/34, 76.2, 212, 213, 620, 946

(56) References Cited

U.S. PATENT DOCUMENTS 4,055,772 A   10/1977   Leung ...................... 307/10 R
4,288,778 A   9/1981    Zucker ........................ 340/64
4,538,262 A   8/1985    Sinniger et al. ............... 370/85
4,697,092 A   9/1987    Roggendorf et al. ...... 307/10 R
4,754,255 A   6/1988    Saunders et al. ............. 340/64
4,760,275 A   7/1988    Sato et al. ................. 307/10 R
4,792,783 A   12/1988   Burgess et al. ............... 340/22
4,794,368 A   12/1988   Grossheim et al. ........... 340/63
4,841,159 A   6/1989    Evans et al. .................. 307/38

(List continued on next page.)

FOREIGN PATENT DOCUMENTS

DE   19530721     2/1997    ............. H02J/9/04
EP   0699562      3/1996    ........... B60R/16/02
WO   97/28988     8/1997    ........... B60R/16/02

OTHER PUBLICATIONS

Society of Automotive Engineers, Inc., "Surface Vehicle Information Report," SAE J2058 (Jun. 21, 1990).
Society of Automotive Engineers, Inc., "Surface Vehicle Standard," SAE J1850.
Mark Thompson, "The Thick and Thin of Car Cabling," *IEEE Spectrum*, pp. 42–45 (2/96).

*Primary Examiner*—Toan Pham
(74) *Attorney, Agent, or Firm*—Allen, Dyer, Doppelt, Milbrath & Gilchrist, P.A.

(57) ABSTRACT

A vehicle system includes a remote function controller, and a data bus adaptor cartridge removably coupled to a data bus adaptor cartridge connector for permitting communications between control circuitry and at least one vehicle device over the data communications bus. The control circuitry may couple to the data bus adaptor cartridge through serial or parallel interfaces. The control circuitry may generate digital command codes, and the data bus adaptor cartridge may convert the digital command codes into data communications bus signals according to a desired protocol. The control circuitry may also read digital codes, and the data bus adaptor cartridge may convert data communications bus signals into digital codes according to a desired protocol for the control circuitry.

46 Claims, 6 Drawing Sheets

U.S. PATENT DOCUMENTS

| | | | | |
|---|---|---|---|---|
| 4,926,332 | A | 5/1990 | Komuro et al. | 701/36 |
| 4,928,778 | A | 5/1990 | Tin | 180/167 |
| 4,997,053 | A | 3/1991 | Drori et al. | 180/287 |
| 5,006,843 | A | 4/1991 | Hauer | 340/825.31 |
| 5,040,990 | A | 8/1991 | Suman et al. | 439/34 |
| 5,046,041 | A | 9/1991 | Lecocq et al. | 710/42 |
| 5,049,867 | A | 9/1991 | Stouffer | 340/426 |
| 5,054,569 | A | 10/1991 | Scott et al. | 180/167 |
| 5,081,667 | A | 1/1992 | Drori et al. | 379/59 |
| 5,142,278 | A | 8/1992 | Moallemi et al. | 340/825.06 |
| 5,146,215 | A | 9/1992 | Drori | 340/825.32 |
| 5,216,407 | A | 6/1993 | Hwang | 340/426 |
| 5,243,322 | A | 9/1993 | Thompson et al. | 340/429 |
| 5,252,966 | A | 10/1993 | Lambropoulos et al. | 340/825.69 |
| 5,406,270 | A | 4/1995 | Van Lente | 340/825.34 |
| 5,467,070 | A | 11/1995 | Drori et al. | 340/426 |
| 5,473,540 | A | 12/1995 | Schmitz | 701/1 |
| 5,475,818 | A | 12/1995 | Molyneaux et al. | 395/200.05 |
| 5,481,253 | A | 1/1996 | Phelan et al. | 340/825.31 |
| 5,521,588 | A | 5/1996 | Kühner et al. | 340/825.22 |
| 5,523,948 | A | 6/1996 | Adrain | 701/99 |
| 5,555,498 | A | 9/1996 | Berra et al. | 701/33 |
| 5,606,306 | A | 2/1997 | Mutoh et al. | 340/426 |
| 5,627,529 | A | 5/1997 | Duckworth et al. | 340/825.69 |
| 5,689,142 | A | 11/1997 | Liu | 307/10.5 |
| 5,708,417 | A | 1/1998 | Tallman et al. | 340/539 |
| 5,719,551 | A | 2/1998 | Flick | 340/426 |
| 5,729,191 | A | 3/1998 | Allen et al. | 340/426 |
| 5,751,073 | A | 5/1998 | Ross | 307/10.5 |
| 5,808,564 | A | 9/1998 | Simms et al. | 340/990 |
| 5,811,886 | A | 9/1998 | Majmudar | 307/10.2 |
| 5,832,397 | A | 11/1998 | Yoshida et al. | 701/29 |
| 5,838,255 | A | 11/1998 | Di Croce | 340/825.69 |
| 5,864,297 | A * | 1/1999 | Sollestre et al. | 340/5.23 |
| 5,872,519 | A | 2/1999 | Issa et al. | 340/825.31 |
| 5,874,889 | A | 2/1999 | Higdon et al. | 340/426 |
| 6,011,460 | A * | 1/2000 | Flick | 340/426 |
| 6,028,505 | A | 2/2000 | Drori | 340/426 |
| 6,249,216 | B1 * | 6/2001 | Flick | 340/426 |
| 6,275,147 | B1 * | 8/2001 | Flick | 340/426 |
| 6,297,731 | B1 * | 10/2001 | Flick | 340/426 |
| 6,346,876 | B1 * | 2/2002 | Flick | 340/426 |

* cited by examiner

REMOTE VEHICLE FUNCTION CONTROL SYSTEM USING DATA BUS ADAPTOR CARTRIDGE AND ASSOCIATED METHODS

RELATED APPLICATIONS

The present application is a continuation-in-part of U.S. patent application Ser. No. 09/583,257 filed May 31, 2000, which in turn, is a continuation-in-part of U.S. patent application Ser. No. 09/382,245 filed Aug. 25, 1999, now U.S. Pat. No. 6,275,147 which in turn, is a continuation of U.S. Pat. Ser. No. 09/023,838 filed Feb. 13, 1998 now U.S. Pat. No. 6,011,460, which in turn, is a continuation-in-part of U.S. patent application Ser. No. 08/701,356 filed Aug. 22, 1996, now U.S. Pat. No. 5,719,551.

FIELD OF THE INVENTION

This application is related to the field of control systems and, more particularly, to a remote control system and related methods for vehicles.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in "The Thick and Thin of Car Cabling" by Thompson appearing in the IEEE Spectrum, February 1996, pp. 42–45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle control systems, such as aftermarket vehicle security systems, are for hardwired connection to vehicle devices and are not readily adaptable to a vehicle including a data communications bus. Moreover, a vehicle security system if adapted for a communications bus and devices for one particular model, model year, and manufacturer, may not be compatible with any other models, model years, or manufacturers. Other systems for the control of vehicle functions may also suffer from such shortcomings.

SUMMARY OF THE INVENTION

In view of the foregoing background, it is therefore an object of the invention to provide a vehicle remote function control system, such as for a vehicle including a data communications bus, which can be readily interfaced to the data communications bus.

This and other objects, features and advantages in accordance with the present invention are provided by a system including a remote function controller comprising a data bus adaptor cartridge connector, and control circuitry coupled thereto, and a data bus adaptor cartridge removably coupled to the data bus adaptor cartridge connector. The data bus adaptor cartridge is for permitting communications between the control circuitry and at least one vehicle device over the data communications bus. The adaptor cartridge may provide compatibility with a number of different vehicle types, for example.

The control circuitry may further comprise a serial interface, and the data bus adaptor cartridge may comprise a serial interface to be coupled to the control circuitry. In other embodiments, the control circuitry may comprise a parallel interface, and the data bus adaptor cartridge may comprise a parallel interface.

The control circuitry may generate digital command codes. In these embodiments, the data bus adaptor cartridge converts the digital command codes into data communications bus signals according to a desired protocol. The desired protocol may be based upon at least one of a desired signal level, a desired signal modulation scheme, and a desired communication rate.

The control circuitry may also generate at least one set of digital command codes comprising at least one working command signal and at least one non-working command signal for a given vehicle to thereby provide command compatibility with a plurality of different vehicles. The control circuitry may also read digital codes, and the data bus adaptor cartridge may convert data communications bus signals into digital codes according to a desired protocol for the control circuitry. Again, the desired protocol may be based upon at least one of a desired signal level, a desired signal modulation scheme, and a desired communication rate.

The control circuitry may be for storing a set of device codes for a given vehicle device for a plurality of different vehicles, for reading a device code from the data communications bus, and for determining a match between a read device code and the stored device codes to thereby provide reading compatibility with a plurality of different vehicles.

The data bus adaptor cartridge may comprise a memory, and a download learning interface for storing in the memory at least one of vehicle device codes and a desired protocol for a given vehicle from a downloading device. In other words, the data bus adaptor cartridge may be downloaded with the vehicle specific digital codes and/or protocol. Alternately, the data bus adaptor cartridge comprises a data bus learning circuit for learning at least one of vehicle device codes and a desired protocol for a given vehicle from signals carried on the data bus.

The data bus adaptor cartridge may include at least one first electrical conductor. The data bus adaptor cartridge connector may also comprise at least one second electrical conductor for engaging the at least one first electrical conductor of the data bus adaptor cartridge. In addition, the remote function controller may further comprise a circuit board carrying the data bus adaptor cartridge connector and the control circuitry.

At least one remote transmitter may be provided for operating the security controller. In these embodiments, the control circuitry may comprise a receiver and a processor connected thereto. The remote function controller may comprise at least one of a security controller, a remote keyless entry controller, and a remote start controller.

In another embodiment, the data bus adaptor device may comprise at least one integrated circuit. Accordingly, the connector may be an integrated circuit socket.

A method aspect of the invention is for permitting a remote function controller comprising control circuitry to operate in a vehicle including a data communications bus connecting a plurality of vehicle devices. The method may include coupling a data bus adaptor cartridge connector to the control circuitry, and removably coupling a data bus adaptor cartridge to the data bus adaptor cartridge connector. This may be done to permit communications between the control circuitry and at least one vehicle device over the data communications bus.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime and double prime notation are used in alternate embodiments to indicate similar elements.

Figure 1:
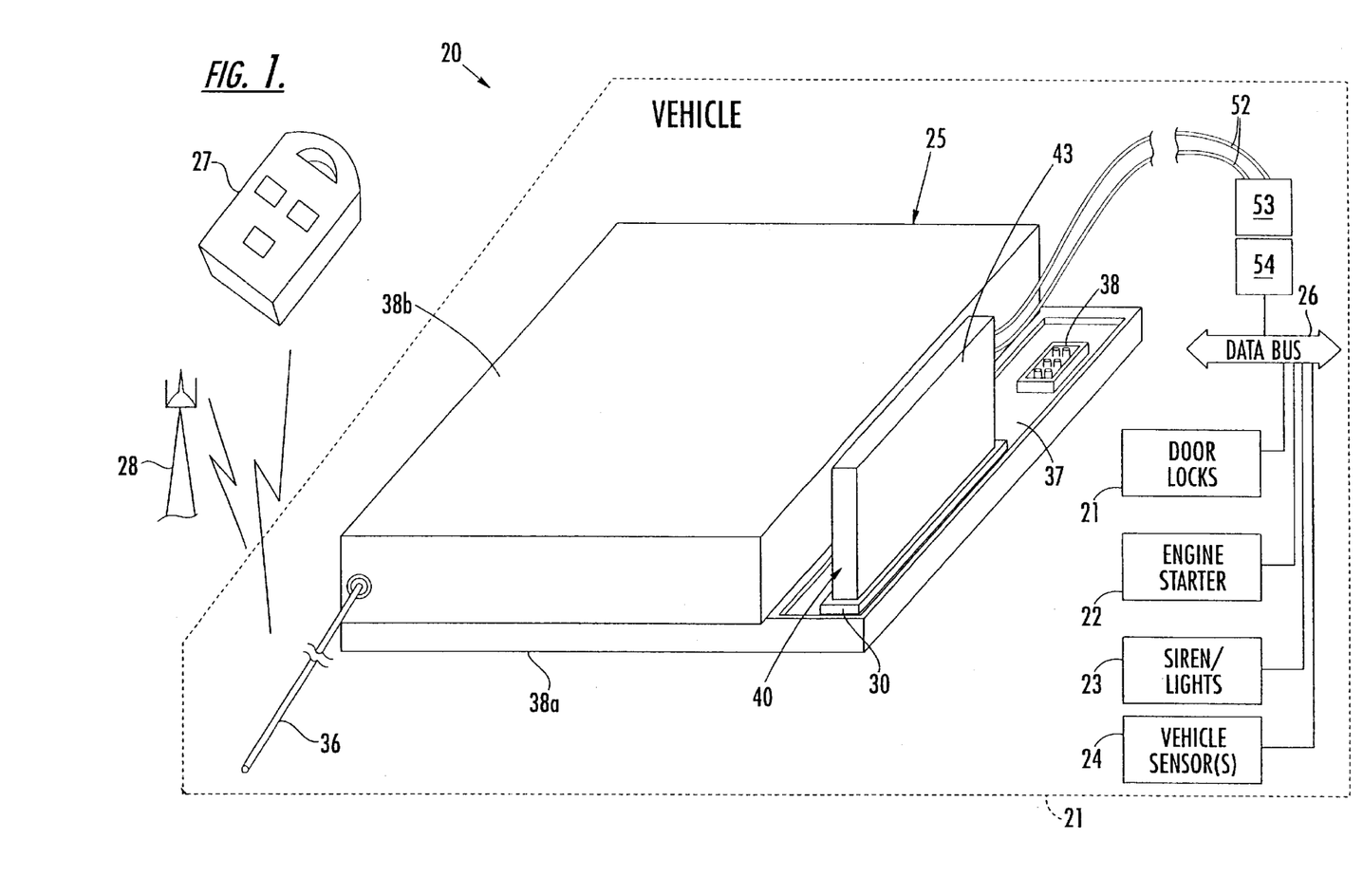
FIG. 1 is a schematic block diagram of a vehicle remote control system in accordance with the invention.
Figure 2:
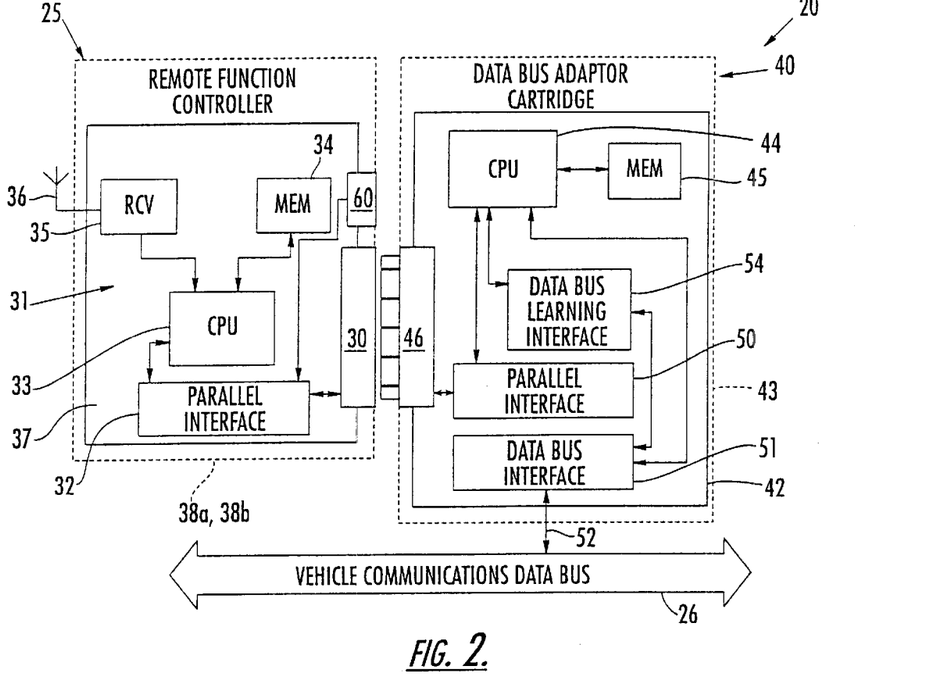
FIG. 2 is a more detailed schematic block diagram of the remote function controller and data bus adaptor cartridge as shown in FIG. 1.

Referring initially to FIGS. 1 and 2, a control system 20 for a vehicle 21 is now described. The control system 20 includes a remote function controller 25 connected to a data communications bus 26 in the vehicle 21. The data communications bus 26 may be any of several types, such as compatible with the J1850 or CAN standards, or other type of bus as will be appreciated by those skilled in the art.

The system 20 also includes a data bus adaptor cartridge connector 30, and control circuitry 31 coupled thereto, and a data bus adaptor cartridge 40 removably coupled to the data bus adaptor cartridge connector. The data bus adaptor cartridge 40 is for permitting communications between the control circuitry 31 and at least one vehicle device over the data communications bus 26.

The at least one vehicle device may include one or more of vehicle door locks 21, an engine starter 22, and a siren or lights 23 as schematically illustrated. One or more sensing devices 24 may also be connected to the data communications bus 26. These types of vehicle devices 21–24 may directly connected to the data communications bus 26 or may be connected to communicate over the bus via another intervening vehicle controller module as will be appreciated by those skilled in the art. Other similar devices may also be connected to the data communications bus 26, and those of skill in the art will recognize that the system 20 of the present invention can communicate with such other devices as well.

The control circuitry 31 may include a parallel interface 32 for interfacing to a corresponding parallel interface 41 in the data bus adaptor cartridge 40. The control circuitry 31 also illustratively includes a processor or CPU 33, a memory 34 connected to the CPU, and a receiver 35 connected to the CPU. In other embodiments, the memory 34 may be incorporated in the CPU. An antenna 36 in the form of a wire as shown in FIG. 1 may be connected to the receiver 35. The control circuitry 31 may be in the form of integrated circuits and/or discrete circuit components mounted on a printed circuit board 37 as will be appreciated by those skilled in the art.

The remote function controller 25 may also include lower and upper housing shells 38a, 38b assembled together and enclosing most or all of the circuit board 37. As shown in FIG. 1, for example, an end portion of the circuit board 37 may be exposed to permit the data bus adaptor cartridge 40 to be received in the connector 30 which is carried by this exposed end portion.

A second connector 60 is also shown in the illustrated embodiment, and this connector may be used to interface to a device not connected to the data communications bus 26. For example, this second connector 60 could permit coupling to an indicator LED, or other similar device. Of course, in other embodiments, this second connector 60 is not needed.

The data bus adaptor cartridge 40 may also include its own circuit board 42 which carries one or more integrated and/or discrete electronic components. The cartridge 42 may also include its own housing shell 43, although this may not be needed in other embodiments as will be explained in greater detail below.

The data bus adaptor cartridge 40 may include a processor or CPU 44, and a memory 45 connected thereto. Also the cartridge 40 includes a connector portion 46 which mates with the data bus adaptor connector 30 carried by the remote function controller 25. The illustrated cartridge 40 also includes a parallel interface 50 which cooperates with the parallel interface 32 of the remote function controller 25 to permit the exchange of signals therewith.

The data bus adaptor cartridge 40 also illustratively includes a data bus interface 51. This interface 51 sends and receives signals from the data communications bus 26 at the proper signal levels, modulation scheme, and/or data rates as will be appreciated by those skilled in the art. The signals are illustratively carried by wires 52 which terminate at a connector 53. This connector 53 is illustratively connected to the data bus connector 54.

The receiver 36 may receive signals from a small handheld transmitter 27 and/or from a fixed remote transmitter 28 as will be appreciated by those skilled in the art. The remote transmitter may also be a geostationary or moving satellite in other embodiments. The remote transmitter 27, 28 sends signals to the system 20 to cause various operations at the vehicle. For example, the remote. function controller 25 may be for a security system and the user may wish to switch between armed and disarmed modes. The remote function controller 25 may also be for remote keyless entry in which case the transmitter signals relate to locking and unlocking the vehicle doors. The remote function controller 25 may also be for remote starting the vehicle engine in which case the signals relate to starting the engine as will be appreciated by those skilled in the art. As will also be understood by those skilled in the art, other remote functions and combinations of remote functions are contemplated by the present invention.

The remote transmitter 27 may be a small portable unit including a housing, function control switches carried by the housing, a battery within the housing, and the associated transmitter circuitry. This type of remote handheld transmitter is commonly used in conventional vehicle security systems, remote start systems, and remote keyless entry systems. The communications from the remote transmitter 27 to the receiver 35 at the vehicle 21 is typically a direct radio frequency link, that is, there is no intervening communications links. However, in other embodiments, the remote transmitter 27 may indirectly communicate with the receiver 35 via other communications infrastructure, such as via satellite, or cellular communications, via the public switched telephone network (PSTN) and/or over the world wide web or Internet, as will be appreciated by those skilled in the art.

The remote transmitter 27 may also be a passive transponder type device, that takes power from an associated transponder reader as will be appreciated by those skilled in the art, and automatically transmits a signal to the reader. For example, the transponder may be of the type carried in conjunction with the vehicle keys, or may be embedded in the key as will be readily appreciated by those skilled in the art.

The data bus adaptor cartridge 40 also illustratively includes data bus learning circuitry 54 for learning at least one of desired codes or a desired protocol from signals on the data bus 26. Although this data bus learning circuitry 54 is shown separate from the CPU 44, in other embodiments, all or a part of this circuitry may be included with the CPU as will be appreciated by those skilled in the art. The desired protocol may be based upon at least one of a desired signal level, a desired signal modulation scheme, and a desired communication rate. In other words, the data bus learning interface 54 may monitor signals on the data bus 26 and thereby learn the proper protocol. Extending this concept, the data bus learning interface may also permit learning of circuit codes to operate certain devices as will be explained in greater detail below.

In some embodiments, the control circuitry 31 of the remote function controller 25 may generate digital command codes. In these embodiments, the data bus adaptor cartridge 40 converts the digital command codes into data communications bus signals according to a desired protocol. The desired protocol may be based upon at least one of a desired signal level, a desired signal modulation scheme, and a desired communication rate.

The control circuitry 21 may also generate at least one set of digital command codes comprising at least one working command signal and at least one non-working command signal for a given vehicle to thereby provide command compatibility with a plurality of different vehicles. The control circuitry 21 may also read digital codes, and the data bus adaptor cartridge 40 may convert data communications bus signals into digital codes according to a desired protocol for the control circuitry. Again, the desired protocol may be based upon at least one of a desired signal level, a desired signal modulation scheme, and a desired communication rate.

The control circuitry 31 may be for storing a set of device codes for a given vehicle device for a plurality of different vehicles, for reading a device code from the data communications bus 26, and for determining a match between a read device code and the stored device codes to thereby provide reading compatibility with a plurality of different vehicles. The reading and sending of digital codes will be discussed in greater detail below.

Figure 3:
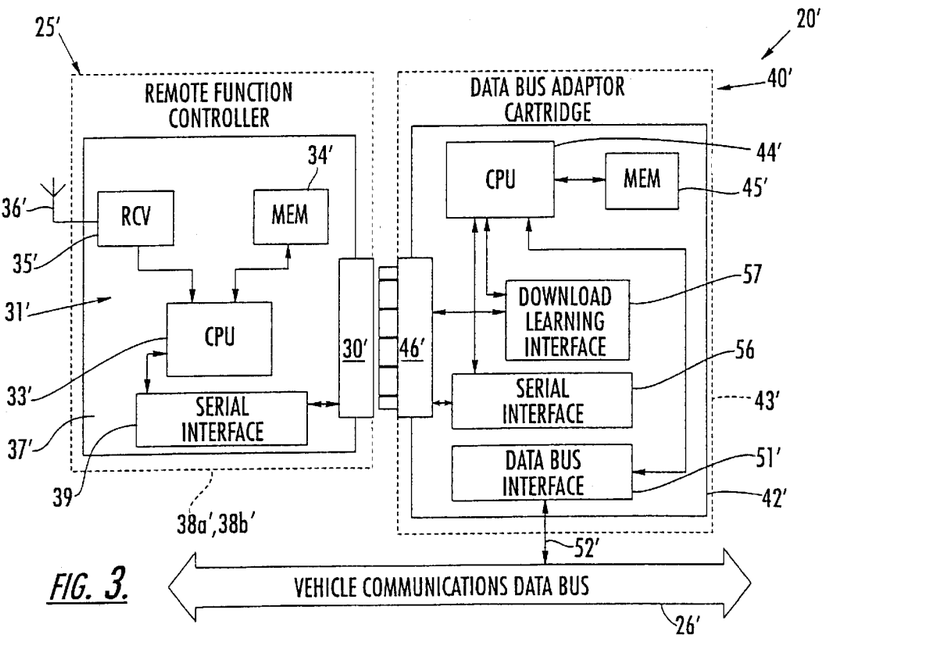
FIG. 3 is a more detailed schematic block diagram of another embodiment of a remote function controller and data bus adaptor cartridge in accordance with the invention.

Turning now additionally to FIG. 3, another embodiment of the remote function controller 25' and data bus adaptor cartridge 40' are now described, and wherein prime notation is used to indicate similar elements to the first embodiment described above with reference to FIGS. 1 and 2. In this illustrated embodiment, the remote function controller 25' includes a serial interface 39, and the data bus adaptor cartridge 40' comprises a corresponding serial interface 56 to be coupled to the serial interface of the remote function controller.

This second embodiment of the remote function controller 25' and data bus adaptor cartridge 40' also differs in that the data bus adaptor cartridge illustratively includes a download learning interface 57 for learning desired codes and/or a desired protocol from a downloading device. For example, the cartridge 40' could be temporarily connected to a computer to received the desired codes or protocol for a given vehicle as will be appreciated by those skilled in the art.

The connector 46' could be used for the download learning or another connector, not shown, may be used. Although the download learning interface 57 is shown as a separate circuit portion, it could be implemented in whole or in part in the CPU 44' as will be appreciated by those skilled in the art. This circuitry defines the download learning means of the adaptor cartridge 40. Of course, the downloading computer could have, in turn, already downloaded or be in the process of downloading the information from the Internet, for example. Other types of downloading are also contemplated by the invention.

The other components of FIG. 3 are similar to those in FIG. 2 and are indicated with prime notation. These other similar elements need no further discussion herein.

Figures 4, 5, 6:
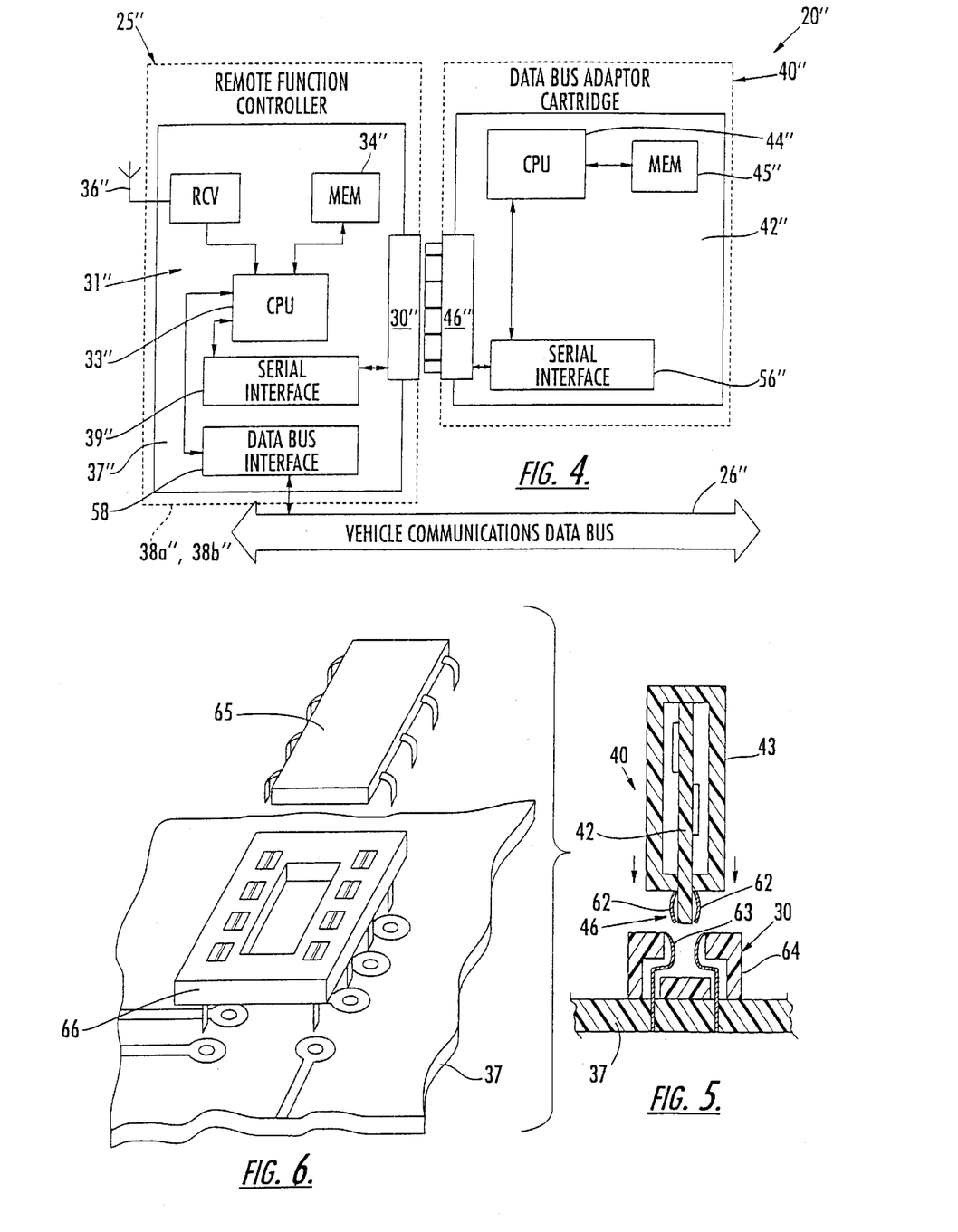
FIG. 4 is a more detailed schematic block diagram of yet another embodiment of a remote function controller and data bus adaptor cartridge in accordance with the invention.
FIG. 5 is a schematic cross-sectional view of the data bus adaptor cartridge and associated connector as shown in FIG. 1.
FIG. 6 is an exploded perspective view of an embodiment of a data bus adaptor device in the form of an integrated circuit, an integrated circuit socket, and a corresponding circuit board portion of the remote function controller data bus in accordance with another embodiment of the present invention.

Referring now briefly to FIG. 4, yet another embodiment of a remote function controller 25" and data bus adaptor cartridge 40" are now described. Double prime notation is used to indicate similar elements in this embodiment. In this embodiment, the data bus interface 58 is provided in the remote function controller 25" rather than the data bus adaptor cartridge 40". In this embodiment, the data bus adaptor cartridge 40" cooperates with the remote function controller 25" to communicate over the data bus 26"; however, the data bus interface 58 is carried by the circuit board 37" of the remote function controller.

Referring now to FIGS. 5 and 6, two different plug-in or connector arrangements in accordance with the invention are now described. As shown in FIG. 5, the data bus adaptor cartridge 40 may include a housing 43 which carries the circuit board 42. The circuit board 42 may include an end portion which extends outwardly beyond the lower end of the housing as shown in the illustrated embodiment. Electrical conductors 62 may be carried by this protruding circuit board portion defining the connector 46 and which engages corresponding conductors 63 carried by a body portion 64 of the connector 30. The connector body portion 64 is mounted to the adjacent circuit board 37 of the remote function controller 25. Of course this arrangement could be reversed and many other types of removable electrical connection are contemplated by the present invention.

As shown in FIG. 6, for example, the data bus adaptor circuitry or cartridge may in the form of a single integrated circuit 65 which is removably mounted to the circuit board 37 via an integrated circuit socket 66 as will be appreciated by those skilled in the art. In other embodiments, similar removable cartridge configurations are also possible as will also be appreciated by those skilled in the art.

As will be readily appreciated by those skilled in the art, the vehicle 21 includes a number of electrical/electronic devices that can be controlled and/or the status thereof read via the data communications bus 26. The vehicle devices connected to the data bus 26 may be considered to be relatively simple devices, such as sensors, or more complicated devices with some internal processing, such as may generally be considered as controllers.

Figure 7:
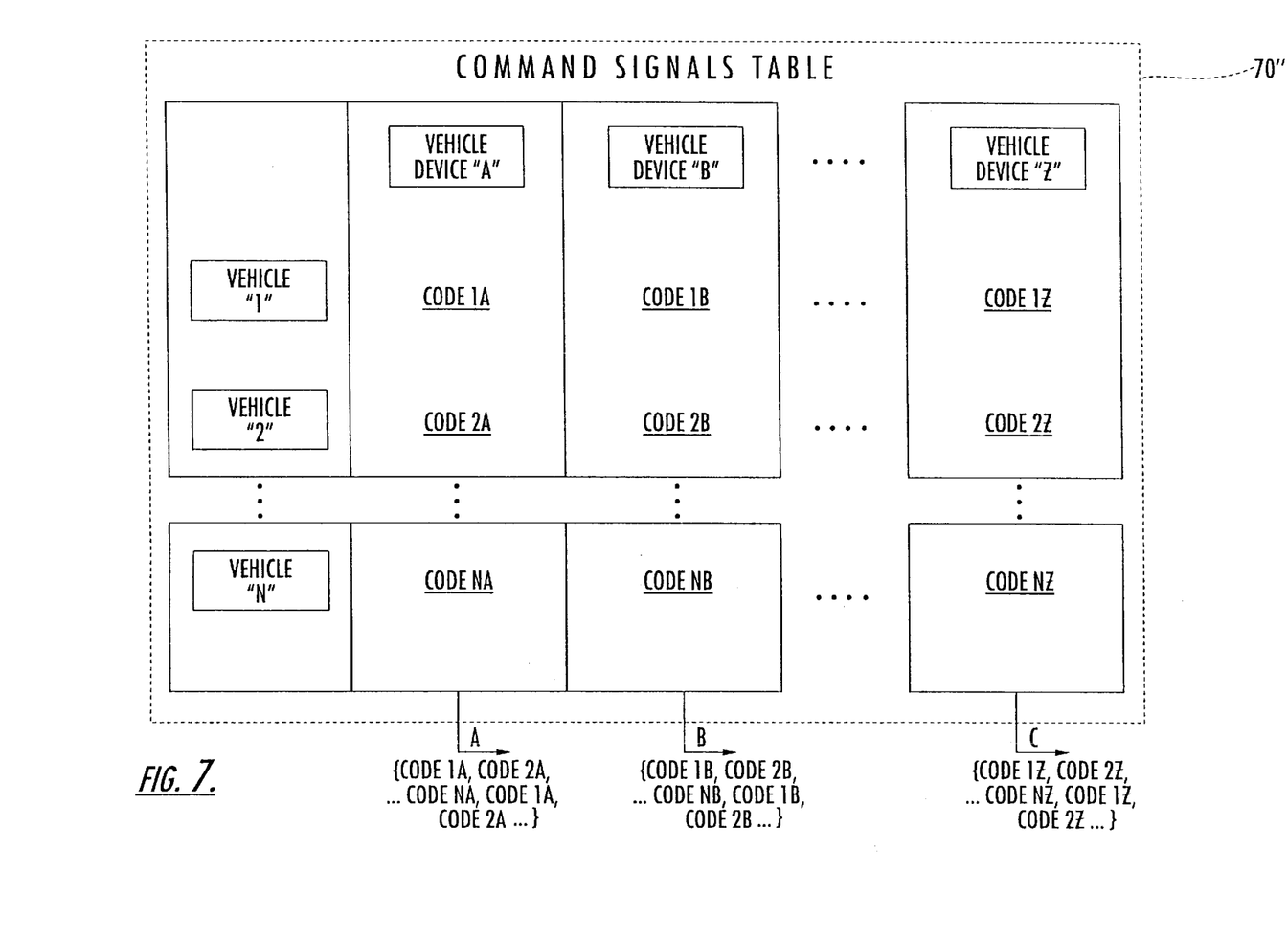
FIG. 7 is a schematic diagram illustrating processing of command signals by the remote function controller of FIG. 1.

The remote function controller 25 may provide multi-vehicle compatibility in one or both directions of communications via the data communications bus 26. Referring now additionally to FIG. 7, the drive or generation of signals on the data bus portion of communication is now further described. In this embodiment, the remote function controller 25 includes memory 34 for the command signals.

The devices connected to the data communications bus 26 may include a siren or lights 23 or other alarm indicator. The vehicle devices may also include one or more door lock actuators 21 as would be likely used by a security system or remote keyless entry system, for example, as would be readily appreciated by those skilled in the art. For a remote start system, one or more remote engine starting devices 22 may be connected to the data communications bus 26. Such a remote starting device 22 may be a starter relay, for example, controlled by signals from the data communications bus. The remote starting device 22 could also be a device or circuit to bypass an engine immobilizer circuit as will be appreciated by those skilled in the art.

The vehicle device to which signals are to be sent by the remote function controller 25 may also include another controller, such as an engine management controller, not shown. The engine management controller could be sent signals such as to prevent or enable starting for security or remote start applications as will be appreciated by those skilled in the art.

In accordance with this aspect of the invention, the remote function controller 25 preferably generates at least one set of command signals on the data communications bus 26 for the at least one vehicle device. The at least one set of command signals preferably comprises at least one working command signal and at least one non-working command signal for a given vehicle to thereby provide compatibility with the plurality of different vehicles. In other words, multiple signals or codes can be generated on the data communications bus 26, and only that code for the given vehicle and device will cause an operation or response from the vehicle device.

This provides for a relatively simple and straightforward approach to interface or cooperate with a vehicle having a data communications bus 26, and wherein the controller 25 is advantageously compatible with a number of different vehicles. Since typically it may be desired to interface to a plurality of vehicle devices, the remote function controller 25 may generate a respective set of command signals for each of the vehicle devices.

Such multi-vehicle compatibility provided by the controller 25 is especially advantageous in after-market systems, such as for security, remote keyless entry, or remote starting for example. The ability to interface through the data communications bus 26 also significantly reduces the wiring complexity needed to interface to the associated vehicle devices.

The remote function controller 25 may sequentially generate the different command signals (working and non-working) for an intended vehicle device. To ensure effective communications even in the presence of noise, for example, the multi-vehicle compatible controller 25 may generate the set of command signals a plurality of times, such as, for example, two to five times. The need to effectively communicate should be balanced against possible traffic congestion on the data bus 26 as will be appreciated by those skilled in the art.

Referring now more specifically to the diagram of FIG. 7, the operation of an embodiment of the remote function controller 25 is further described. The controller 25 may operate by arranging in the memory 34 a common table 70 as shown. The CPU 33 upon determining that an action needs to be performed, such as unlocking the driver's door, for example, would identify the appropriate column from the table 70 from among the columns labeled "vehicle device A" to "vehicle device Z". For example, the appropriate column may be "vehicle device B", in which case the CPU would then read the memory locations in this column to generate on the bus 26 the appropriate set of codes to lock the driver's door for each of the N vehicles with which the multi-vehicle compatible controller 25' is compatible. Of course, only one of the codes would be a working code, and the other codes would cause no vehicle function to be performed. For example, if vehicle "2" was the vehicle, only the code 2B would cause the driver's door to unlock.

The actual coded signals would be compatible with the particular data communications bus 26 as will be appreciated by those skilled in the art. The codes may be binary codes, which for convenience can be represented more simply by corresponding hexadecimal codes as would also be appreciated by those skilled in the art. For example, for an unlock all vehicle doors to be commanded in a 1995 Jeep Grand Cherokee, the code may be 03868004, for a 2000 Jeep Grand Cherokee, the code may be 0422A00400. As will be readily appreciated by those skilled in the art, such codes can be obtained from the manufacturers directly, or may be read from the data bus 26 using any one of a number of commercially available diagnostic tools for reading the data bus, for example.

The set of command signals may be repeated as mentioned above, and as schematically illustrated at the lower portion of the table 70. Of course, the memory 34 may store the actual codes, but may also store data enabling generation of the set of command signals by the CPU 33. This may be particularly so where certain portions of the code, e.g. preamble, or some other portion, are common across either multiple vehicles, and/or over multiple vehicle devices.

The number of vehicles and number of devices to be controlled using the remote function controller 25 can both be relatively large to cover a substantial portion of the vehicle marketplace. Alternatively, the multiple command signal concept may also be advantageously used to provide compatibility for as few as two vehicles, and even a single vehicle device.

In those embodiments, where the remote function controller 25 provides multi-vehicle code compatibility for command signals to be transmitted on the data communications bus 26, the data bus adaptor cartridge 40 provides compatibility with different vehicle protocols. The protocol may be in terms of one or more of signal level, modulation scheme, or transmission rate, for example. Of course, in other embodiments, this multi-vehicle code compatibility could be provided in the data bus adaptor cartridge 40 as will be appreciated by those skilled in the art.

Figure 8:
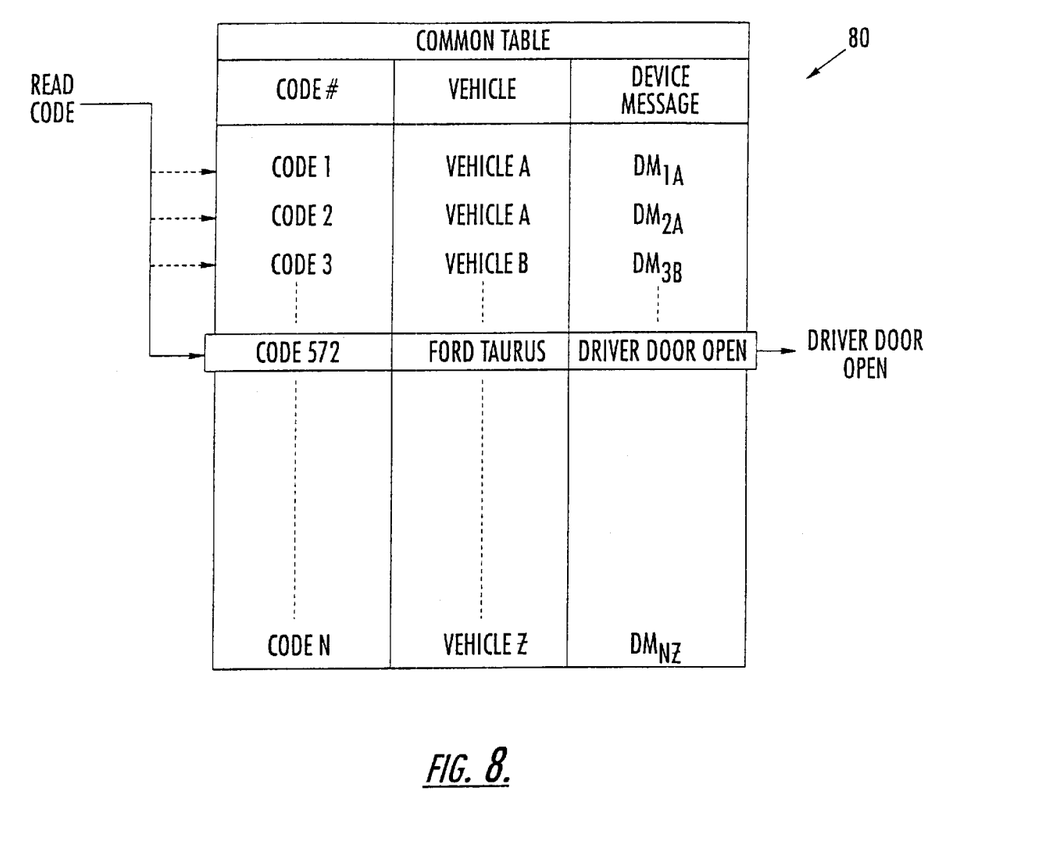
FIG. 8 is a schematic diagram illustrating processing of a code read from the data communications bus in accordance with an embodiment of the remote function controller of FIG. 1.
Figure 9:
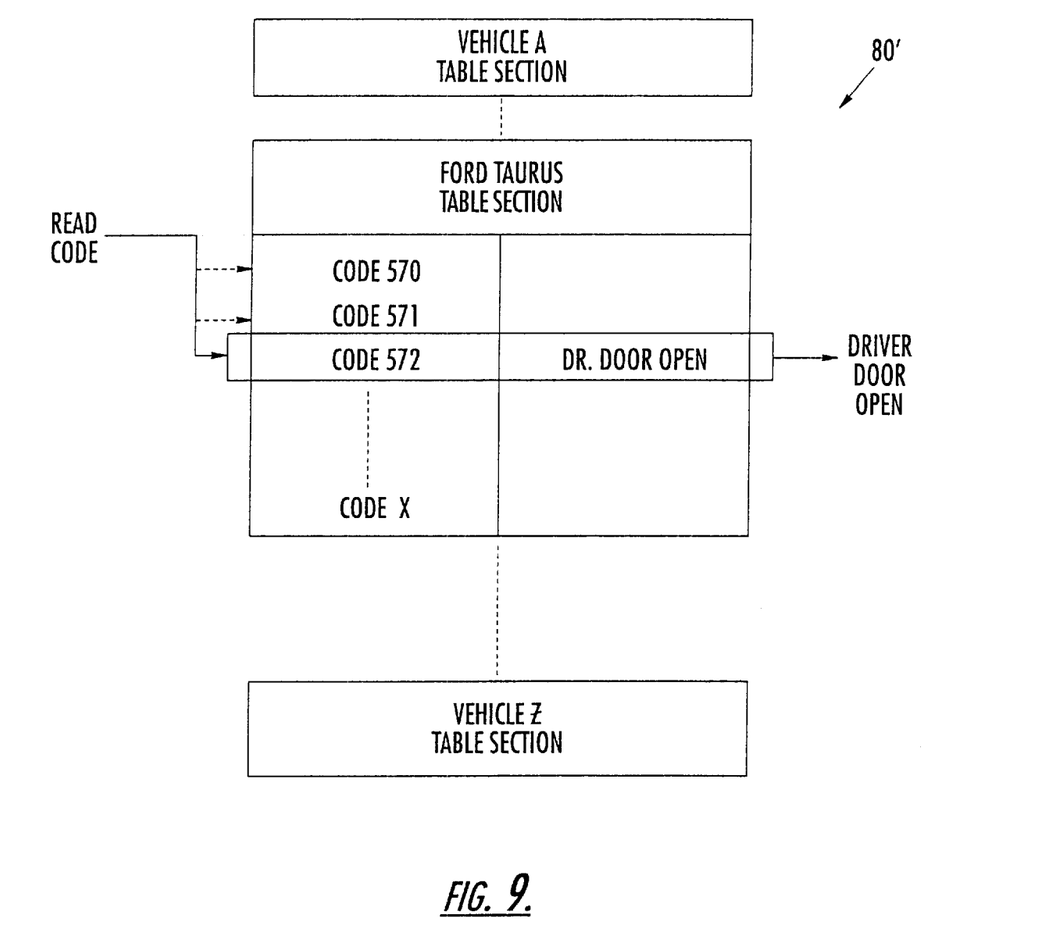
FIG. 9 is a schematic diagram illustrating processing of a code read from the data communications bus in accordance with another embodiment of the remote function controller of FIG. 1.

Turning now to FIGS. 8 and 9, the other direction of communication is now described. In particular, the reverse direction or reading of signals from the data communications bus 26 is now described. Many of the components are the same as those described above, and, hence, need no further description. The CPU 33 is connected to the memory 34 which now serves as the code look-up memory. The data bus 26 also connects one or more of vehicle sensors 24 such as for security, remote starting or keyless entry, for example, to the remote function controller 25.

The compatibility to read a code and determine the message or content thereof for a vehicle device from among a plurality of vehicles can be used alone or in combination with the compatibility for writing or generating signals on the bus described above. More particularly, the remote function controller 25 may be for storing a set of device codes for a given vehicle device for a plurality of different vehicles, for reading a device code from the data communications bus 26, and for determining a match between a read device code and the stored device codes to thereby provide compatibility with a plurality of different vehicles. Such an arrangement provides for a relatively simple and straightforward approach to interface with a vehicle having a data communications bus 26.

As noted briefly above, the remote function controller 25 may include the code look-up memory 34 for the stored device codes, and a processor or CPU 33 cooperating with the memory for determining the match between the read device code and the stored device codes. The at least one vehicle device may include a plurality of vehicle devices, and, accordingly, the memory 34 of the controller 25 preferably stores a respective set of device codes for each of the plurality of vehicle devices.

Referring now more specifically to FIG. 8, the look-up table feature of the remote function controller 25 is now described. A common table 80 may be created which contains a column for the vehicle codes in some predefined sequence, such as in a numerical order beginning with a first code, Code 1, and ending with a last code, Code N, as illustrated. The central column in the illustrated embodiment includes the corresponding vehicle identification with the vehicles extending from a first vehicle, Vehicle A, to a last vehicle, Vehicle Z. The number of codes and vehicles may be selected so that a given remote function controller 25 is useable across an economically large number of vehicles as will be appreciated by those skilled in the art.

The last or rightmost column in the illustrated table 80 is the device data or message corresponding to the associated vehicle and code. These device messages extend from a first message, $DM_{1A}$, to a last device message, $DM_{NZ}$. The messages may be of many different types, such as driver door open or closed, hood open or closed, shock sensor triggered, brake pressure indicated, gearshift selector in Park, etc. as will be appreciated by those skilled in the art.

By way of example, the common table 80 includes a blocked row schematically illustrating a match for a Code 572. This code is for a Ford Taurus and indicates that the driver's door is open. This type of data may be useful in any of the illustrated implementations including vehicle security, remote keyless entry, or remote starting. The CPU 33 would read the code on the data bus 26 and compare the code against the stored codes to determine a match. The CPU 33 is likely to buffer some or all of a code when received to subsequently be compared using the table 80 as will be understood by those skilled in the art. In other embodiments, individual bits or blocks thereof may be compared as they are received.

An alternate embodiment of a common table 80' is now explained with reference to FIG. 9. In this case the overall or common table 80' may be considered parsed or divided into a plurality of vehicle table sections. The first table section is for vehicle A, and the last for vehicle Z in the illustrated embodiment. This embodiment also illustrates the driver door for the Ford Taurus as being matched from the read signal from the data communications bus 26. What is of interest in this embodiment, is that upon initial set-up or an initial learning period, only the codes for the learned vehicle need then later be compared to the read code. Accordingly, a time savings may be realized.

Those of skill in the art will recognize that the tables 80 and 80' of FIGS. 8 and 9 are exemplary illustrations from among many possible configurations of look-up tables that may be used in accordance with the present invention. Other configurations are also contemplated by the present invention.

Since it may also be desirable to re-install the remote function controller 25 in another vehicle, the controller may be reset and another vehicle learned or configured during an initial set-up. This concept is generally described as an embodiment of a desired signal enabling function or feature in related parent U.S. patent application Ser. No. 09/382,245 filed Aug. 25, 1999, which in turn, is a continuation of U.S. Pat. No. 6,011,460, which in turn, is a continuation-in-part of U.S. Pat. No. 5,719,551, and the disclosure of each of which are incorporated herein by reference in its entirety.

In those embodiments, where the remote function controller 25 provides multi-vehicle code compatibility for reading signals from the data communications bus 26, the data bus adaptor cartridge 40 provides compatibility with different vehicle protocols. The protocol may be in terms of one or more of signal level, modulation scheme, or transmission rate, for example. Of course, in other embodiments, this multi-vehicle code reading compatibility could be provided in the data bus adaptor cartridge 40 as will be appreciated by those skilled in the art.

A method aspect of the invention is for permitting a remote function controller 25 comprising control circuitry 31 to operate in a vehicle 21 including a data communications bus 26 connecting a plurality of vehicle devices 21–24. The method may include coupling a data bus adaptor cartridge connector 30 to the control circuitry 31, and removably coupling a data bus adaptor cartridge 40 to the data bus adaptor cartridge connector. This may be done to permit communications between the control circuitry and at least one vehicle device over the data communications bus.

Other features relating to vehicle control systems are disclosed in copending patent applications entitled "REMOTE START SYSTEM FOR A VEHICLE HAVING A DATA COMMUNICATIONS BUS AND RELATED METHODS" Ser. No. 09/583,333 and "MULTI-VEHICLE COMPATIBLE CONTROL SYSTEM FOR READING FROM A DATA BUS AND ASSOCIATED METHODS" Ser. No. 09/583,257, the entire disclosures of which are incorporated herein by reference.

Many modifications and other embodiments of the invention will come to the mind of one skilled in the art having the benefit of the teachings presented in the foregoing descriptions and the associated drawings. Accordingly, it is understood that the invention is not to be limited to the illustrated embodiments disclosed, and that other modifications and embodiments are intended to be included within the spirit and scope of the appended claims.

That which is claimed is:

1. A system for a vehicle including a data communications bus connecting a plurality of vehicle devices, the system comprising:
    a remote function controller comprising a data bus adaptor cartridge connector, and control circuitry coupled thereto; and
    a data bus adaptor cartridge removably coupled to said data bus adaptor cartridge connector for permitting communications between said control circuitry and at least one vehicle device over the data communications bus.

2. A system according to claim 1 wherein said control circuitry further comprises a serial interface, and wherein said data bus adaptor cartridge comprises a serial interface coupled to the serial interface of said control circuitry.

3. A system according to claim 1 wherein said control circuitry further comprises a parallel interface, and wherein said data bus adaptor cartridge comprises a parallel interface coupled to the parallel interface of said control circuitry.

4. A system according to claim 1 wherein said control circuitry generates digital command codes; and wherein said data bus adaptor cartridge converts the digital command codes into data communications bus signals according to a desired protocol.

5. A system according to claim 4 wherein the desired protocol is based upon at least one of a desired signal level, a desired signal modulation scheme, and a desired communication rate.

6. A system according to claim 4 wherein said control circuitry generates at least one set of digital command codes comprising at least one working command signal and at least one non-working command signal for a given vehicle to thereby provide command compatibility with a plurality of different vehicles.

7. A system according to claim 1 wherein said control circuitry reads digital codes; and wherein said data bus adaptor cartridge converts data communications bus signals into digital codes according to a desired protocol for said control circuitry.

8. A system according to claim 7 wherein the desired protocol is based upon at least one of a desired signal level, a desired signal modulation scheme, and a desired communication rate.

9. A system according to claim 7 wherein said control circuitry is for storing a set of device codes for a given vehicle device for a plurality of different vehicles, for reading a device code from the data communications bus, and for determining a match between a read device code and the stored device codes to thereby provide reading compatibility with a plurality of different vehicles.

10. A system according to claim 1 wherein said data bus adaptor cartridge comprises:
a memory; and
a download learning interface for storing in said memory at least one of vehicle device codes and a desired protocol for a given vehicle from a downloading device.

11. A system according to claim 1 wherein said data bus adaptor cartridge comprises a data bus learning circuit for learning at least one of vehicle device codes and a desired protocol for a given vehicle from signals carried on the data bus.

12. A system according to claim 1 wherein said data bus adaptor cartridge includes at least one first electrical conductor; and wherein said data bus adaptor cartridge connector comprises at least one second electrical conductor for engaging said at least one first electrical conductor of said data bus adaptor cartridge.

13. A system according to claim 1 wherein said remote function controller further comprises a circuit board carrying said data bus adaptor cartridge connector and said control circuitry.

14. A system according to claim 1 further comprising at least one remote transmitter for operating said security controller; and wherein said control circuitry comprises a receiver and a processor connected thereto.

15. A system according to claim 1 wherein said remote function controller comprises at least one of a security controller, a remote keyless entry controller, and a remote start controller.

16. A system for a vehicle including a data communications bus connecting a plurality of vehicle devices, the system comprising:
a remote function controller comprising circuit board, a data bus adaptor cartridge connector carried by said circuit board, and control circuitry carried by said circuit board and coupled to said data bus adaptor cartridge connector, said control circuitry comprising a serial interface; and
a data bus adaptor cartridge removably coupled to said data bus adaptor cartridge connector for permitting communications between said control circuitry and at least one vehicle device over the data communications bus, said data bus adaptor cartridge comprising a serial interface for communication with said serial interface of said controller.

17. A system according to claim 16 wherein said control circuitry generates digital command codes; and wherein said data bus adaptor cartridge converts the digital command codes into data communications bus signals according to a desired protocol.

18. A system according to claim 17 wherein the desired protocol is based upon at least one of a desired signal level, a desired signal modulation scheme, and a desired communication rate.

19. A system according to claim 17 wherein said control circuitry generates at least one set of digital command codes comprising at least one working command signal and at least one non-working command signal for a given vehicle to thereby provide command compatibility with a plurality of different vehicles.

20. A system according to claim 16 wherein said control circuitry reads digital codes; and wherein said data bus adaptor cartridge converts data communications bus signals into digital codes according to a desired protocol for said control circuitry.

21. A system according to claim 20 wherein the desired protocol is based upon at least one of a desired signal level, a desired signal modulation scheme, and a desired communication rate.

22. A system according to claim 20 wherein said control circuitry is for storing a set of device codes for a given vehicle device for a plurality of different vehicles, for reading a device code from the data communications bus, and for determining a match between a read device code and the stored device codes to thereby provide reading compatibility with a plurality of different vehicles.

23. A system according to claim 16 wherein said data bus adaptor cartridge comprises:
a memory; and
a download learning interface for storing in said memory at least one of vehicle device codes and a desired protocol for a given vehicle from a downloading device.

24. A system according to claim 16 wherein said data bus adaptor cartridge comprises a data bus learning circuit for learning at least one of vehicle device codes and a desired protocol for a given vehicle from signals carried on the data bus.

25. A system according to claim 16 further comprising at least one remote transmitter for operating said control circuitry; and wherein said control circuitry comprises a receiver and a processor connected thereto.

26. A system according to claim 16 wherein said remote function controller comprises at least one of a security controller, a remote keyless entry controller, and a remote start controller.

27. A system for a vehicle including a data communications bus connecting a plurality of vehicle devices, the system comprising:
a remote function controller comprising a data bus adaptor cartridge connector and control circuitry coupled thereto; and
a data bus adaptor cartridge removably coupled to said data bus adaptor cartridge connector for permitting communications between said control circuitry and at least one vehicle device over the data communications bus, said data bus adaptor cartridge comprising
a memory, and
download learning means for storing in said memory at least one of vehicle device codes and a desired protocol for a given vehicle from a downloading device.

28. A system according to claim 27 wherein said data bus adaptor cartridge includes at least one first electrical conductor; and wherein said data bus adaptor cartridge connector comprises at least one second electrical conductor for engaging said at least one first electrical conductor of said data bus adaptor cartridge.

29. A system according to claim 27 further comprising at least one remote transmitter for operating said control circuitry; and wherein said control circuitry comprises a receiver and a processor connected thereto.

30. A system according to claim 27 wherein said remote function controller comprises at least one of a security controller, a remote keyless entry controller, and a remote start controller.

31. A system for a vehicle including a data communications bus connecting a plurality of vehicle devices, the system comprising:

a remote function controller comprising a data bus adaptor device connector, and control circuitry coupled thereto; and a data bus adaptor device removably coupled to said data bus adaptor device connector for permitting communications between said control circuitry and at least one vehicle device over the data communications bus.

32. A system according to claim 31 wherein said data bus adaptor device comprises a cartridge including a housing and circuitry contained therein.

33. A system according to claim 31 wherein said data bus adaptor device comprises at least one integrated circuit.

34. A system according to claim 33 wherein said data bus adaptor device connector comprises at least one integrated circuit socket.

35. A method for permitting a remote function controller comprising control circuitry to operate in a vehicle including a data communications bus connecting a plurality of vehicle devices, the method comprising:

coupling a data bus adaptor cartridge connector to the control circuitry; and removably coupling a data bus adaptor cartridge to the data bus adaptor cartridge connector for permitting communications between the control circuitry and at least one vehicle device over the data communications bus.

36. A method according to claim 35 wherein the control circuitry further comprises a serial interface, and wherein the data bus adaptor cartridge comprises a serial interface for coupling to the serial interface of the control circuitry.

37. A method according to claim 35 wherein the control circuitry further comprises a parallel interface, and wherein the data bus adaptor cartridge comprises a parallel interface for coupling to the parallel interface of the control circuitry.

38. A method according to claim 35 wherein the control circuitry generates digital command codes; and wherein the data bus adaptor cartridge converts the digital command codes into data communications bus signals according to a desired protocol.

39. A method according to claim 38 wherein the desired protocol is based upon at least one of a desired signal level, a desired signal modulation scheme, and a desired communication rate.

40. A method according to claim 35 wherein the control circuitry reads digital codes; and wherein the data bus adaptor cartridge converts data communications bus signals into digital codes according to a desired protocol for the control circuitry.

41. A method according to claim 40 wherein the desired protocol is based upon at least one of a desired signal level, a desired signal modulation scheme, and a desired communication rate.

42. A method according to claim 35 wherein the remote function controller comprises at least one of a security controller, a remote keyless entry controller, and a remote start controller.

43. A method for permitting a remote function controller comprising control circuitry to operate in a vehicle including a data communications bus connecting a plurality of vehicle devices, the method comprising:

coupling a data bus adaptor device to the control circuitry; and removably coupling a data bus adaptor device to the data bus adaptor device connector for permitting communications between the control circuitry and at least one vehicle device over the data communications bus.

44. A method according to claim 43 wherein the data bus adaptor device comprises a cartridge including a housing and circuitry contained therein.

45. A method according to claim 43 wherein the data bus adaptor device comprises at least one integrated circuit.

46. A method according to claim 45 wherein the data bus adaptor device connector comprises at least one integrated circuit socket.

* * * * *